(12) United States Patent
Dwivedi et al.

(10) Patent No.: US 10,308,193 B1
(45) Date of Patent: Jun. 4, 2019

(54) CAMERA APPARATUS

(71) Applicant: Dura Operating, LLC, Auburn Hills, MI (US)

(72) Inventors: Jayesh Dwivedi, Auburn Hills, MI (US); Aaron Brion Stachewicz, Troy, MI (US); Robert John Hoffman, Jr., Royal Oak, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 0 days.

(21) Appl. No.: 15/896,550

(22) Filed: Feb. 14, 2018

(51) Int. Cl.
*B60R 11/00* (2006.01)
*B60R 11/04* (2006.01)
*G03B 17/12* (2006.01)
*G03B 17/56* (2006.01)

(52) U.S. Cl.
CPC .............. *B60R 11/04* (2013.01); *G03B 17/12* (2013.01); *G03B 17/561* (2013.01); *B60R 2011/0043* (2013.01); *B60R 2011/0085* (2013.01)

(58) Field of Classification Search
CPC ....................................................... G03B 17/38
USPC ............................ 396/56, 25, 26, 27, 28, 29
See application file for complete search history.

(56) References Cited

U.S. PATENT DOCUMENTS

| | | | | |
|---|---|---|---|---|
| 7,460,319 B2 * | 12/2008 | Aiba | ......................... | G02B 7/10 348/E5.025 |
| 8,193,933 B2 * | 6/2012 | Jezierski | ........... | H02M 3/33576 340/540 |
| 8,891,005 B2 | 11/2014 | Sasaki | | |
| 2006/0017842 A1 * | 1/2006 | Jun | ......................... | G03B 37/02 348/373 |
| 2009/0154912 A1 * | 6/2009 | Lin | ......................... | G03B 17/00 396/427 |
| 2009/0251538 A1 * | 10/2009 | Wada | ............... | G08B 13/19619 348/143 |
| 2009/0290860 A1 * | 11/2009 | Uchida | ................... | G02B 7/021 396/144 |
| 2010/0225802 A1 * | 9/2010 | Yamamoto | ........... | F16M 11/126 348/373 |
| 2011/0013900 A1 * | 1/2011 | Takahashi | ............... | G03B 17/00 396/427 |

(Continued)

FOREIGN PATENT DOCUMENTS

CN 106027871 * 10/2016 ............. B60R 11/04
CN 106027871 A 10/2016

*Primary Examiner* — Clayton E. LaBalle
*Assistant Examiner* — Kevin C Butler
(74) *Attorney, Agent, or Firm* — Robert E. Ford; Raymond J. Vivacqua; Steven L. Crane

(57) ABSTRACT

A universal camera apparatus for attachment to a surface includes a dome cover having a central aperture, a camera unit having a body portion and a lens, the body portion mounted to the dome cover and covered by the dome cover, the lens disposed within the central aperture, a base unit supporting the dome cover, the base unit having a central opening extending through the base unit from a universal attachment portion to a flared collar portion, the universal attachment portion forming a seal at an interface with the surface, wherein wiring from the camera unit extends through the central opening, the flared collar portion at least partially surrounds the camera unit, and wherein the dome cover is adjustable about an axis of rotation relative to the base unit, and the camera mount is rotatable about an axis of rotation.

21 Claims, 4 Drawing Sheets

(56) References Cited

U.S. PATENT DOCUMENTS

| | | | | |
|---|---|---|---|---|
| 2011/0064403 A1* | 3/2011 | Nakano | .................. | G03B 17/02 |
| | | | | 396/535 |
| 2011/0310293 A1* | 12/2011 | Yamauchi | .............. | G03B 15/00 |
| | | | | 348/373 |
| 2012/0062789 A1* | 3/2012 | Sasaki | .................... | G03B 17/00 |
| | | | | 348/373 |
| 2012/0169870 A1* | 7/2012 | Jain | .................... | G02B 27/0025 |
| | | | | 348/143 |
| 2013/0094848 A1* | 4/2013 | Wada | .................. | H04N 5/2252 |
| | | | | 396/448 |
| 2013/0100292 A1* | 4/2013 | Mojaver | .............. | H04N 5/2251 |
| | | | | 348/159 |
| 2013/0223834 A1* | 8/2013 | Jikihara | ................. | G03B 11/00 |
| | | | | 396/448 |
| 2013/0287385 A1* | 10/2013 | Andersson | ........... | H04N 5/2252 |
| | | | | 396/427 |
| 2014/0348498 A1* | 11/2014 | Aiba | ...................... | G03B 13/32 |
| | | | | 396/20 |
| 2016/0205299 A1* | 7/2016 | Imaoka | .................. | G02B 13/00 |
| | | | | 348/151 |
| 2018/0024416 A1* | 1/2018 | Kishine | .................... | G02B 7/02 |
| | | | | 359/614 |

* cited by examiner

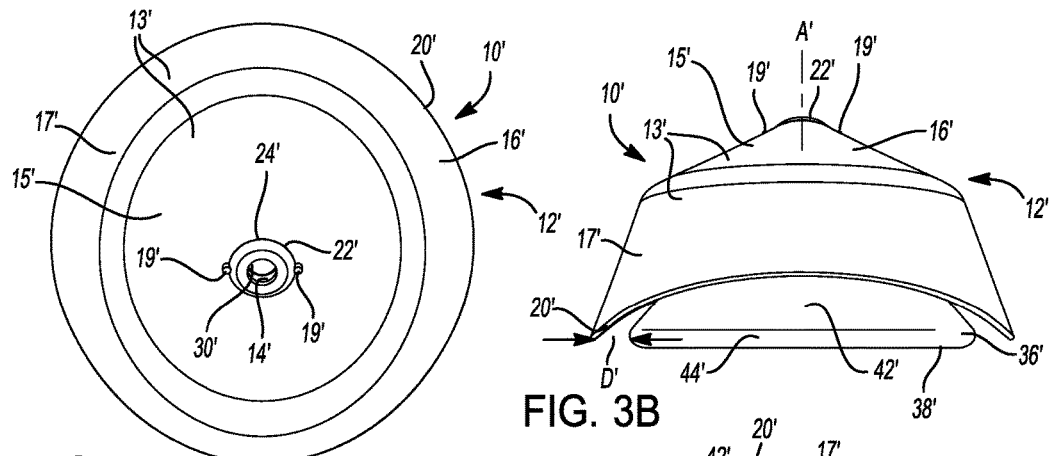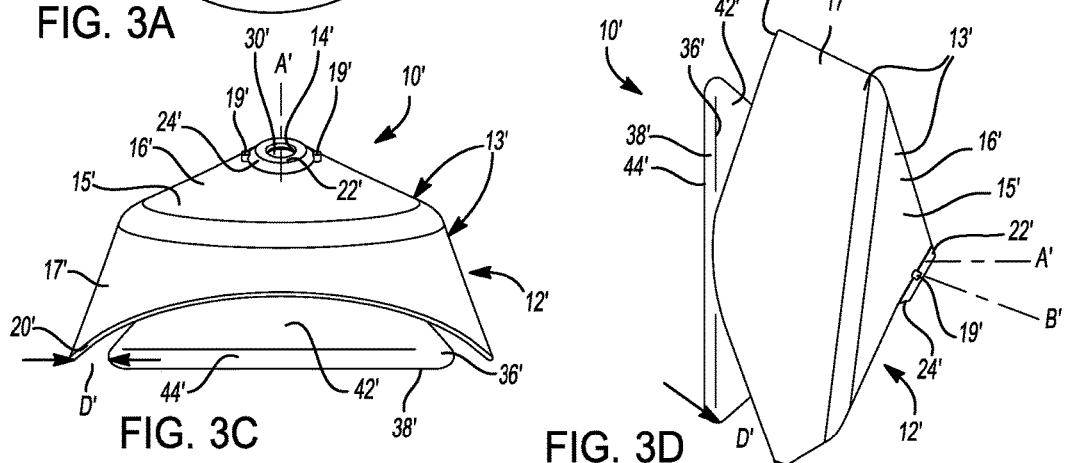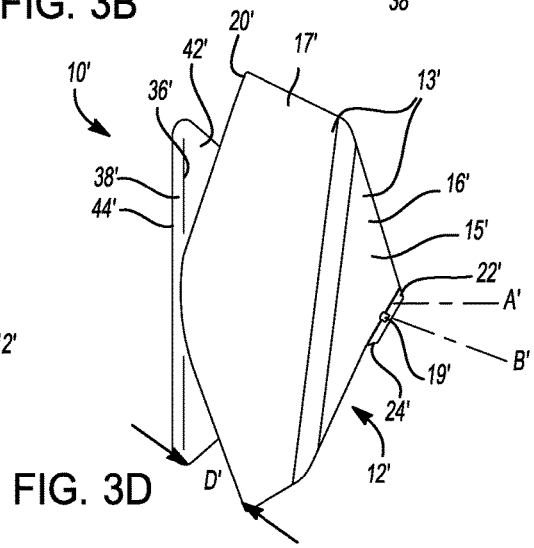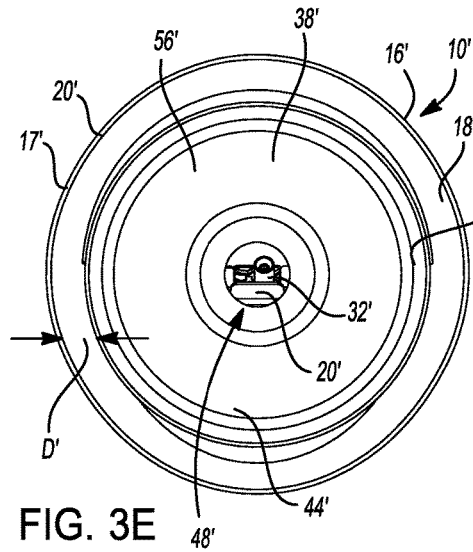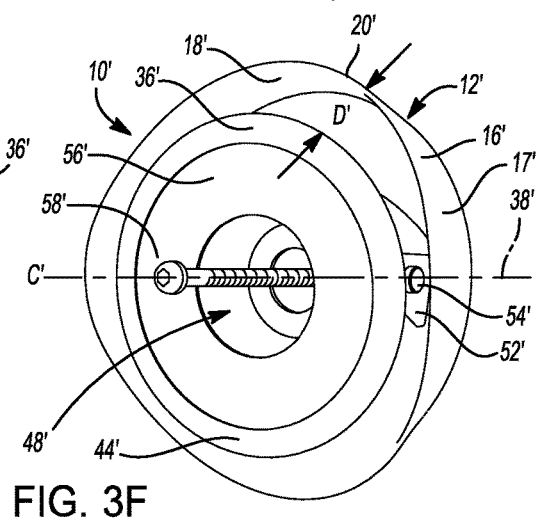

CAMERA APPARATUS

FIELD

The present disclosure relates generally to cameras, and more specifically to cameras for mounting to exterior surfaces of motor vehicles.

BACKGROUND

The statements in this section merely provide background information related to the present disclosure and may or may not constitute prior art.

As motor vehicle safety regulations have become more stringent, crash structures on motor vehicles have become more substantial. As crash structures have become more substantial, pillars surrounding the passenger compartments of motor vehicles have become thicker, thereby obscuring ever-increasing amounts of a driver's field of view. To mitigate such losses, cameras are being used to provide a surround-view perspective of motor vehicles. In order to provide sufficient field of view coverage to generate a surround-view or 360° view image for a motor vehicle driver, a number of cameras must be attached at various locations around the motor vehicle. Moreover, the cameras must be aimed in particular directions in order to capture the necessary field of view. However, contours of the motor vehicle at the various locations where cameras are attached often vary significantly. Moreover, because motor vehicles from different manufacturers are often shaped differently, even when using the same general attachment locations (e.g., front, rear, left and right sides) the contours of the motor vehicle may vary substantially from manufacturer to manufacturer, and even model to model. Therefore, in order to attach cameras to the multiple contours of the motor vehicle, a wide variety of camera attachments is required. However, manufacturing a wide variety of camera attachments can be costly, complex, and inefficient.

Therefore, while current camera attachments and apparati achieve their intended purpose in many applications, there is a need for new and improved camera attachments that are portable, weather-resistant, robust, shock absorbent, and have improved lifespan, modularity, and reduce the overall cost and complexity of manufacture.

SUMMARY

According to one aspect of the present disclosure a universal camera apparatus for attachment to a surface includes a dome cover having a central aperture, a camera unit having a body portion and a lens, the body portion mounted to the dome cover and covered by the dome cover, the lens disposed within the central aperture. The universal camera apparatus further includes a base unit supporting the dome cover, the base unit having a central opening extending through the base unit from a universal attachment portion to a flared collar portion, the universal attachment portion forming a seal at an interface with the surface. The flared collar portion at least partially surrounds the camera unit, and the dome cover is adjustable about an axis of rotation relative to the base portion, and the universal camera apparatus is rotatable about an axis of rotation.

In another aspect of the present disclosure the camera unit extends into the central opening in the base unit, and wiring from the camera unit extends through the central opening.

In another aspect of the present disclosure the universal camera apparatus operates wirelessly.

In yet another aspect of the present disclosure the dome cover is substantially frustoconical, extending from an outer perimeter to the central opening, and the outer perimeter is spaced apart from the universal attachment portion by a distance.

In another aspect of the present disclosure the substantially frustoconical dome cover comprises a plurality of facets extending from the outer perimeter to the central opening.

In still another aspect of the present disclosure the dome cover further includes an angled top portion, the angled top portion being formed in the dome cover proximate the central aperture, and the angled top portion has a first axis angled with respect to a second axis of the frustoconical dome cover In still another aspect of the present disclosure the camera unit is in sealing engagement with the angled top portion of the dome cover.

In still another aspect of the present disclosure the universal attachment portion is substantially frustoconical in shape, extending from a rounded outer edge at the interface with the surface to a lower section of the flared collar portion.

In still another aspect of the present disclosure the flared collar portion extends from the lower section to an upper section. The upper section is proximate the central aperture and the camera unit, and a radius of the flared collar portion is smallest at the lower section and largest at the upper section.

In still another aspect of the present disclosure the base unit further includes a first attachment member engaging with a second attachment member of the dome cover, the first attachment member and second attachment member limiting adjustment or movement of the dome cover relative to the base unit.

In still another aspect of the present disclosure the base portion further includes a third attachment member, the third attachment member having a recessed area proximate the surface and substantially parallel to the surface, a double-sided tape, a gasket material, a suction attachment member, or a mechanical attachment member comprising a toggle anchor, a hinged foot, or a rivet nut.

In still another aspect of the present disclosure the first attachment member and the second attachment member include fasteners, compression fittings, bolts, nuts, screws, clamps, spring bolts, clips, and receivers for fasteners, compression fittings, bolts, nuts, screws, clamps, spring bolts, and clips.

In still another aspect of the present disclosure the first attachment member and the second attachment member secures the dome cover in a predetermined range of positions, and the second axis is angularly adjustable from about 30° either side of perpendicular to the surface, or from about 60° to the surface the surface, to about 120° to the surface.

In still another aspect of the present disclosure at least a portion of the universal attachment portion further includes a resilient material.

In still another aspect of the present disclosure a camera mount for attachment to a surface includes a camera unit having a lens and an image sensor mounted in an image sensor mounting unit. The camera mount further includes a frustoconical dome cover disposed overtop the camera unit, the frustoconical dome cover extending from an outer perimeter to a central peak, the central peak having a cylindrical opening, the lens disposed within the cylindrical opening, the dome cover having a first attachment member. The camera mount further includes a base unit supporting the dome cover, the base unit having second attachment member engaging with the first attachment member, the first attachment member and the second attachment member limiting adjustment or movement of the dome cover relative to the base unit, the base unit having a central opening extending through the base unit from a universal attachment portion to a flared collar portion, the universal attachment portion having a substantially frustoconical shape and extending from a rounded outer edge at an interface with a surface to a lower section of the flared collar portion, at least a portion of the universal attachment portion being composed of a resilient material and forming a seal at the interface with the surface, wiring from the camera unit extending through the central opening, and the flared collar portion at least partially surrounding the camera unit. The frustoconical dome cover is adjustable about an axis of rotation relative to the base portion, the outer perimeter of the frustoconical dome cover is spaced apart from the base unit, and the first attachment member engages with the second attachment member limiting adjustment about the axis of rotation, and the camera mount is rotatable about an axis of rotation.

In still another aspect of the present disclosure the first attachment member and the second attachment member secure the frustoconical dome cover in a predetermined range of positions, such that an axis of the frustoconical dome cover is angularly adjustable from about 30° either side of perpendicular to the surface, or from about 60° to the surface the surface, to about 120° to the surface.

In still another aspect of the present disclosure the flared collar portion extends from the lower section to an upper section, the upper section is proximate the cylindrical opening and the camera unit, and a radius of the flared collar portion is at a minimum at the lower section and at a maximum at the upper section.

In still another aspect of the present disclosure the dome cover further includes an angled top portion, the angled top portion being formed in the dome cover proximate the cylindrical opening, and including the cylindrical opening, wherein the camera unit is in sealing engagement with the angled top portion of the dome cover.

In still another aspect of the present disclosure the universal attachment portion further includes a recessed area proximate to the surface and substantially parallel to the surface and a third attachment member attaching the universal attachment portion to the surface, the third attachment member comprising a double-sided tape, a gasket material, a suction attachment member, a toggle anchor, a hinged foot, or a rivet nut.

In still another aspect of the present disclosure the first attachment member and the second attachment member includes fasteners, compression fittings, bolts, nuts, screws, clamps, spring bolts, clips, and receivers for fasteners, compression fittings, bolts, nuts, screws, clamps, spring bolts, and clips.

In still another aspect of the present disclosure at least one of the receivers further includes a blind hole receiving a fastener.

In still another aspect of the present disclosure a camera mount for attachment to a surface includes a camera unit having a lens and an image sensor mounted in an image sensor mounting unit. The camera mount further includes a substantially frustoconical dome cover disposed overtop the camera unit, the substantially frustoconical dome cover extending from an outer edge to a central peak, the central peak having a cylindrical opening, the lens disposed within the cylindrical opening, the substantially frustoconical dome cover having a first attachment member. The substantially frustoconical dome cover having an angled top portion having an axis angled with respect to a second axis of the substantially frustoconical dome cover, the angled top portion being formed in the substantially frustoconical dome cover proximate the cylindrical opening and including the cylindrical opening, wherein the camera unit is in sealing engagement with the angled top portion of the dome cover. The camera mount further includes a base unit supporting the dome cover and having a universal attachment portion, the base unit having a central opening, a flared collar portion, and a second attachment member engaging with the first attachment member, the first attachment member and the second attachment member limiting adjustment or movement of the substantially frustoconical dome cover relative to the base unit, the universal attachment portion having a substantially frustoconical shape and extending from a rounded outer edge of the universal attachment portion at an interface with the surface to a lower section of the flared collar portion, the flared collar portion extending from a lower section to an upper section, the upper section proximate to the cylindrical opening and the camera unit. A radius of the flared collar portion is at a minimum at the lower section and at a maximum at the upper section, at least a portion of the universal attachment portion being composed of a resilient material and forming a seal at an interface with the surface, wiring from the camera unit extending through the central opening, and the flared collar portion at least partially surrounding the camera unit. The universal attachment portion has a recessed area proximate to the surface and substantially parallel to the surface and a third attachment member attaching the universal attachment portion to the surface, the third attachment member being composed of a double-sided tape, a gasket material, a suction attachment member, a toggle anchor, a hinged foot, or a rivet nut. The frustoconical dome cover is adjustable about an axis of rotation relative to the base portion, the outer edge of the frustoconical dome cover is spaced apart from the base unit, and the first attachment member engages with the second attachment member limiting adjustment about the axis of rotation, such that movement of the frustoconical dome cover is limited to about 30° from either side of perpendicular to the surface, or from about 60° to the surface, to about 120° to the surface, and the camera mount is rotatable about an axis of rotation.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. In the drawings:

FIG. 10 is a bottom view of the camera apparatus of FIG. 1A according to an aspect of the present disclosure;

FIG. 3A is a front view of a camera apparatus according to one aspect of the present disclosure;

FIG. 3B is a top view of the camera apparatus of FIG. 3A according to an aspect of the present disclosure;

FIG. 3C is a bottom view of the camera apparatus of FIG. 3A according to an aspect of the present disclosure;

FIG. 3D is a side view of the camera apparatus of FIG. 3A according to an aspect of the present disclosure;

FIG. 3E is a rear view of the camera apparatus of FIG. 3A according to an aspect of the present disclosure;

FIG. 3F is a rear perspective view of the camera apparatus of FIG. 3A according to an aspect of the present disclosure;

DETAILED DESCRIPTION

The following description is merely exemplary in nature and is not intended to limit the present disclosure, application, or uses.

Figure 1A:
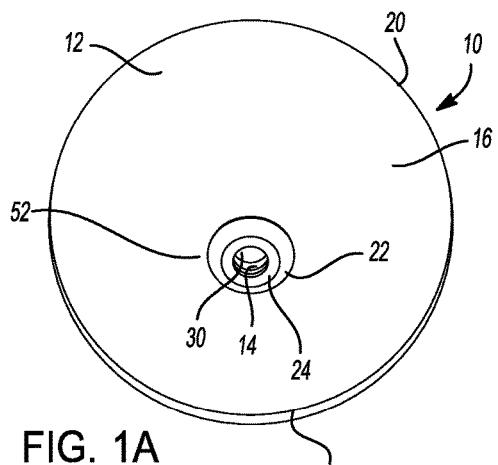
FIG. 1A is a front view of a camera apparatus according to one aspect of the present disclosure.
Figure 1B:
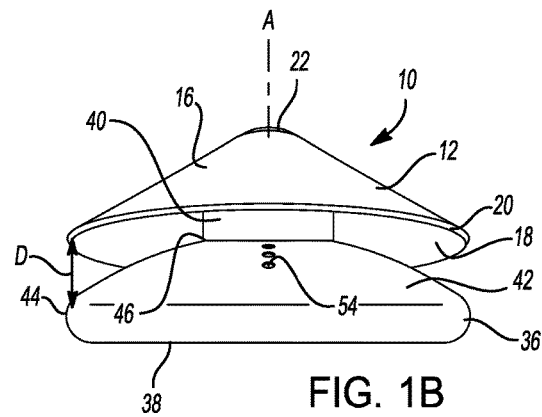
FIG. 1B is a top view of the camera apparatus of FIG. 1A according to an aspect of the present disclosure.
Figure 1C:
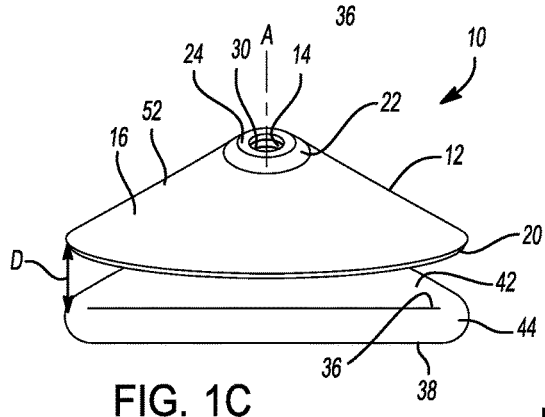
FIG. 1D is a side view of the camera apparatus of FIG. 1A according to an aspect of the present disclosure.
FIG. 1E is a rear view of the camera apparatus of FIG. 1A according to an aspect of the present disclosure.
FIG. 1F is a rear perspective view of the camera apparatus of FIG. 1A according to an aspect of the present disclosure
Figure 1D:
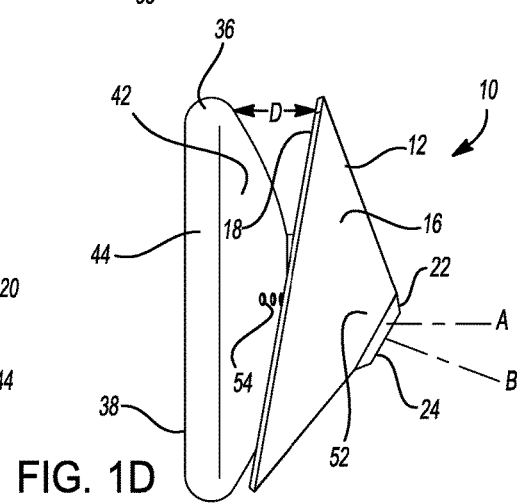
Figure 1E:
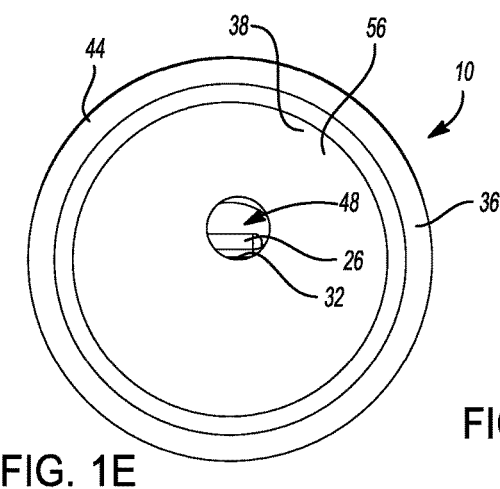
Figure 1F:
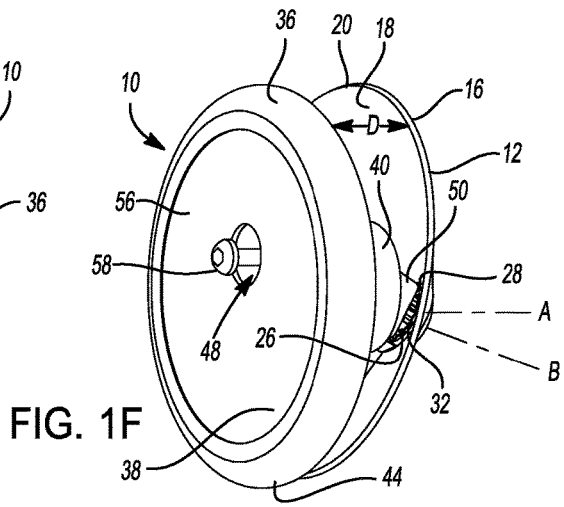
Figures 2A, 2B:
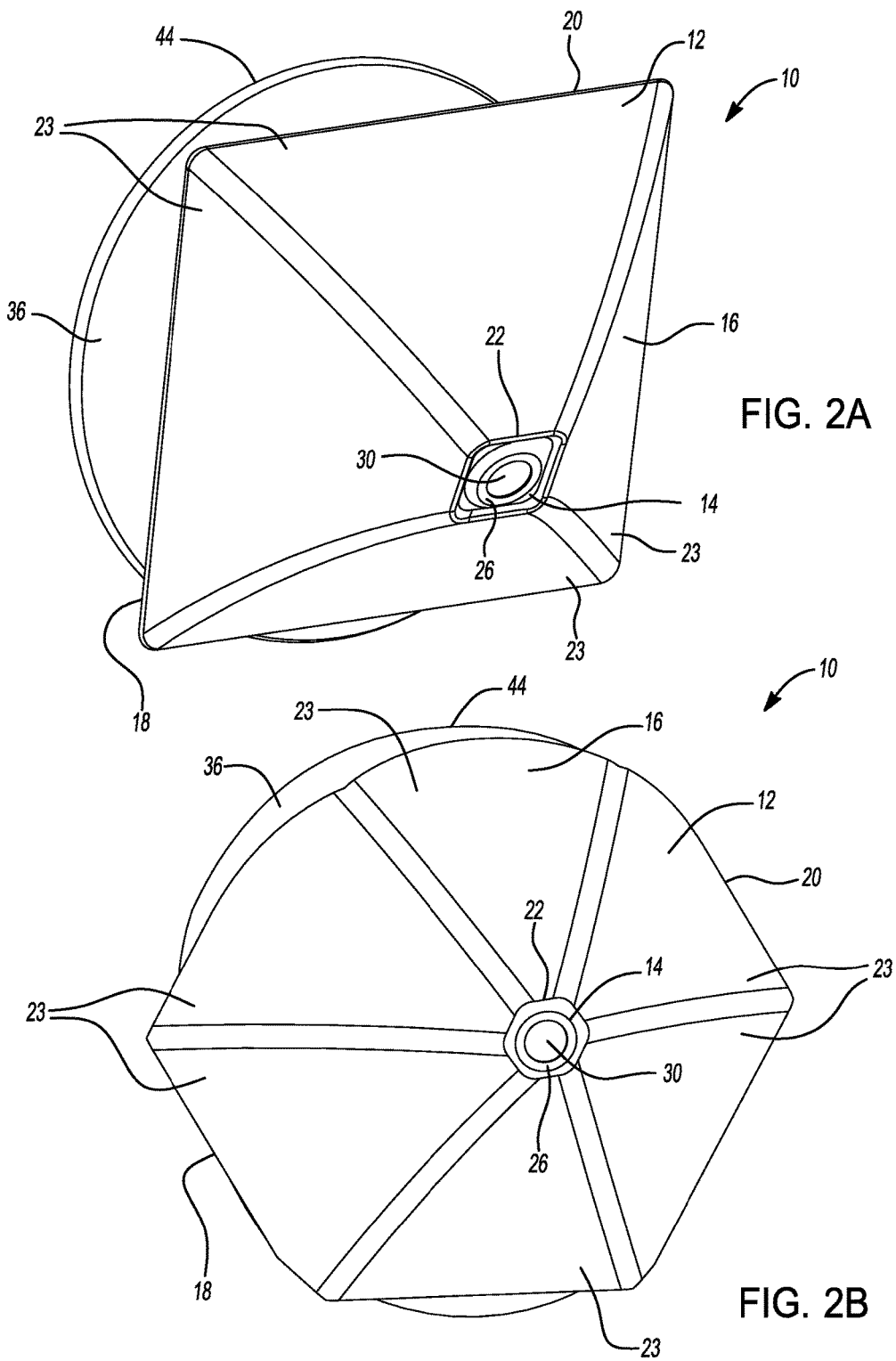
FIG. 2A is a front perspective view of a camera apparatus according to one aspect of the present disclosure.
FIG. 2B is a front perspective view of a camera apparatus according to another aspect of the present disclosure.

Referring to FIGS. 1A-1F, a first example of a camera apparatus is shown and generally indicated by reference number 10. The camera apparatus 10 includes a dome cover 12 with a central aperture 14. In some aspects, the central aperture 14 is a substantially cylindrical opening extending from an exterior surface 16 of the dome cover 12 to an interior surface 18. The dome cover 12 is substantially frustoconical in shape having a first axis "A", and extending from an outer perimeter 20 to a central peak 22. While the dome cover 12 has been described as being substantially frustoconical in shape, it should be understood that the dome cover 12 may include a plurality of facets 23 extending from the outer perimeter 20 to the central peak 22. In FIGS. 2A and 2B, two faceted frustoconical dome covers 12 are shown. FIG. 2A depicts a camera apparatus 10 having a dome cover 12 with a substantially quadrilateral pyramidal shape. FIG. 2B depicts a camera apparatus 10 having a dome cover 12 with a substantially hexagonal pyramidal shape. While FIGS. 2A and 2B include dome covers 12 having four and six sides, it should be understood that depending on the application for which the dome camera apparatus 10 is intended, any number of facets 23 may be included. Thus alterations to the number of facets 23 in the substantially frustoconical dome cover 12 are intended to be within the scope of this application.

Figure 4A:
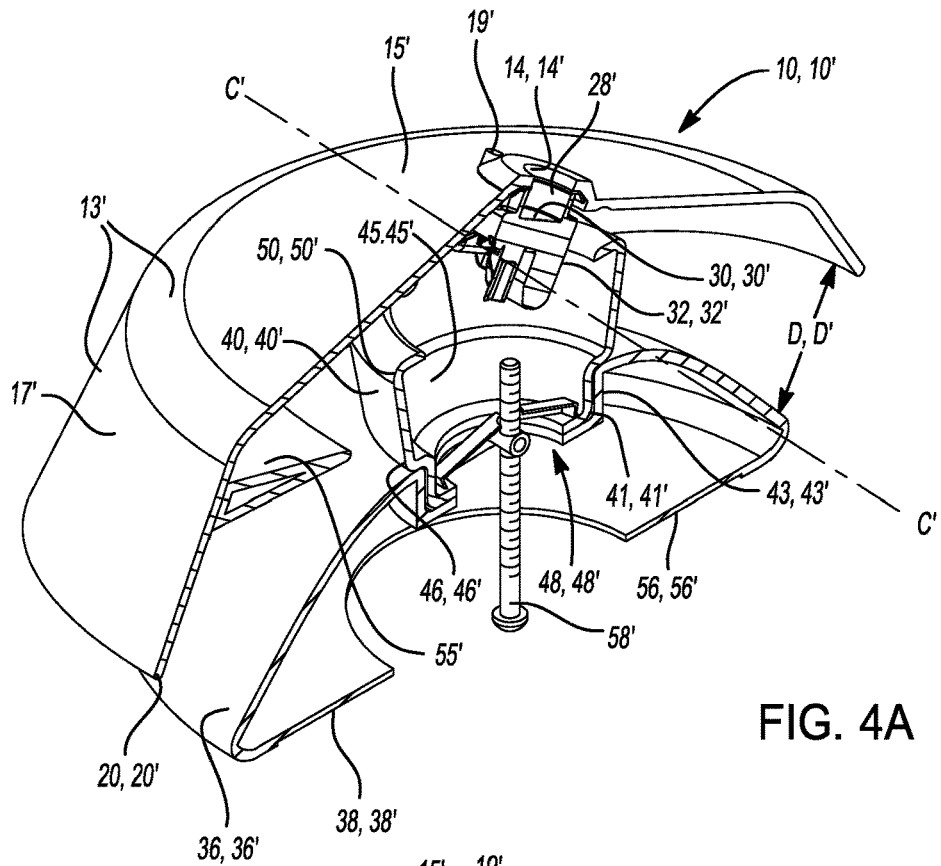
FIG. 4A is a partial cutaway perspective side view of the camera apparatus of FIG. 3A according to an aspect of the present disclosure.
Figure 4B:
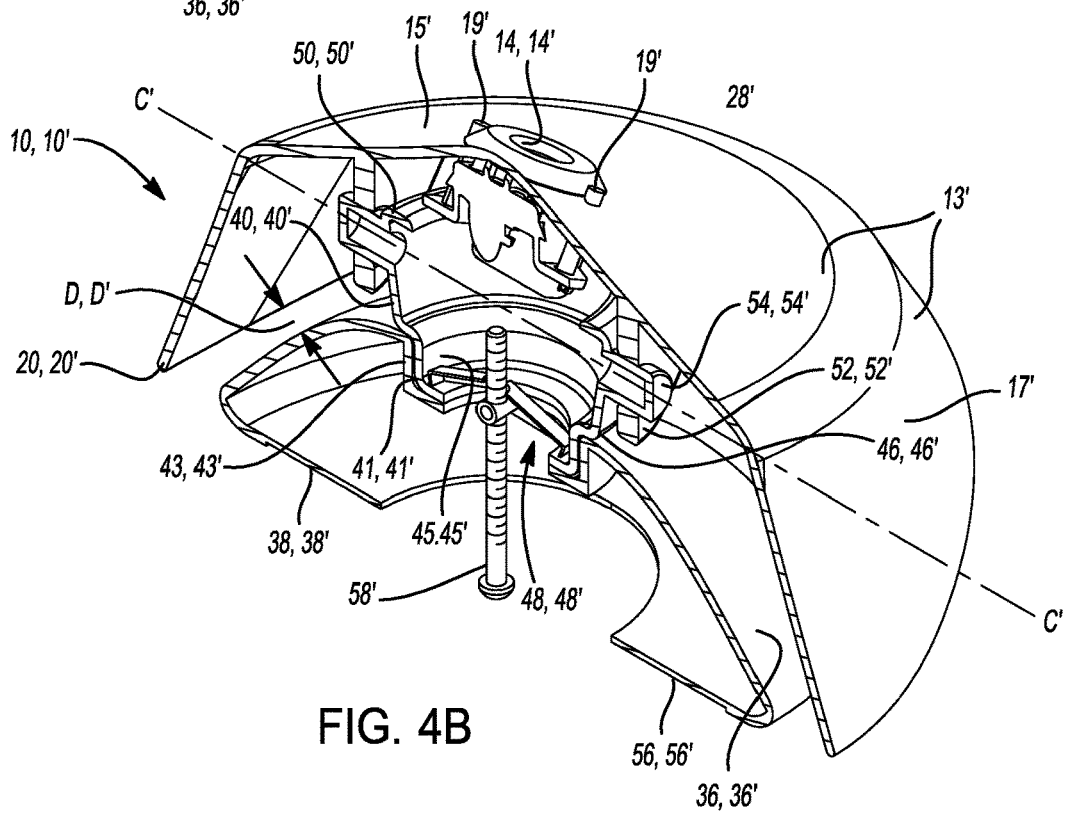
FIG. 4B is a partial cutaway perspective top view of the camera apparatus of FIG. 3A according to an aspect of the present disclosure.

In some aspects, the central peak 22 has an angled portion 24. The angled portion 24 has a second axis "B" angled with respect to the first axis "A". In some aspects, the first axis "A" and the second axis "B" are angled by about 30° with respect to one another. A camera unit 26 (shown in FIG. 2, and in significantly more detail in FIGS. 4A and 4B) is mounted to the interior surface 18 of the dome cover 12. In one example, the camera unit 26 is mounted to the interior surface 18 of the dome cover 12 by a plurality of attachment members (not specifically shown), such as screws, bolts, press fittings, clips, and the like. In addition, the camera unit 26 is sealed to the interior surface 18 of the dome cover 12 by a seal 28 disposed between the interior surface 18 of the dome cover 12 and the camera unit 26.

The camera unit 26 includes a lens 30 and a body portion 32. In several aspects, the body portion 32 is a housing enclosing a plurality of optical and electrical components such as mirrors, focusing lenses, adjustable apertures, shutters, wiring, image sensors such as charged coupled devices (CODs) and complementary metal-oxide semiconductor sensors (CMOSs), and the like. The lens 30 of the camera unit 26 is mounted within the central aperture 14 of the dome cover 12 thereby providing the camera unit 26 with a wide and unobscured field of view. In some examples, the lens 30 of the camera unit 26 may be a fish-eye lens shaped to provide a wide-angled view. In one aspect, because the lens 30 is mounted within the central aperture 14, thereby forming a portion of the exterior surface 16 of the dome cover 12, the field of view of the camera unit 26 is approximately 135°-180°.

The camera apparatus 10 also includes a base unit 36. The base unit 36 extends from a universal attachment portion 38 to a flared collar portion 40. The flared collar portion 40 at least partially surrounds the camera unit 26. In one example, the flared collar portion 40 is integrally and unitarily moulded with the universal attachment portion 38. In another example, the flared collar portion 40 is separate from the universal attachment portion 38. In the second example, the separate flared collar portion 40 is assembled with the universal attachment portion 38 and a second seal 41. The second seal 41 is disposed between a first joining section 43 of the universal attachment portion 38 and a second joining section 45 of the flared collar portion 40. The universal attachment portion 38 has a substantially frustoconical upper surface 42 extending from a rounded outer edge 44 at an interface with a mounting surface (not shown) to a lower section 46 of the flared collar portion 40. In some aspects, the base unit 36 has an overall profile that is somewhat akin to an Erlenmeyer flask, or an hourglass. That is, a radius of the flared collar portion 40 is smallest at or near the lower section 46, and largest at or near the dome cover 12. The camera apparatus of the present disclosure may be affixed to any of a variety of mounting surfaces, such as exterior surfaces of motor vehicles, exterior and/or interior surfaces of buildings and other like structures without departing from the scope or intent of the present disclosure.

In some examples, the base unit 36 also includes a central opening 48 extending through the base unit 36 from the interface with the mounting surface to an upper section 50 of the flared collar portion 40. The central opening 48 provides a conduit through which electrical connectors, wiring, and the like may be disposed. The universal attachment portion 38 forms a waterproof connection with the mounting surface. In some aspects, at least a portion of the universal attachment portion 38 is made of a flexible or resilient material such as rubber, silicone, flexible plastic material, or the like. The flexible or resilient material allows the universal attachment portion 38 to adjust to the contours of a mounting surface thereby sealingly engaging with the mounting surface. The base unit 36 has been described above as having a central opening 48 extending through the base unit 36 from the interface to the upper section 50 of the flared collar portion 40. However, it should be understood that in some variations, the camera apparatus 10 operates wirelessly. In wireless examples, depending on the application, costs, and scale, the base unit 36 may or may not include a central opening 48 extending all the way from the interface to the upper section 50. In other words, in some examples, the central opening 48 extends only through a portion of the base unit 36 from the upper section 50 towards the interface with the mounting surface.

The dome cover 12 is adjustably connected to the base unit 36. In several aspects, the dome cover 12 is angularly and/or rotatably adjustable relative to the base unit 36 from about 30° either side of perpendicular to the mounting surface to which the base unit 36 is mounted. In one aspect, the dome cover 12 is rotatable about an axis of rotation (not shown) relative to the base unit 36. In a further aspect, the dome cover 12 adjustably swivels on top of the base unit 36. In one example, the dome cover 12 is adjustable from about 60° to the surface to about 120° to the mounting surface. The dome cover 12 includes a first attachment member 52. The first attachment member 52 engages with a second attachment member 54 of the base unit 36. The first and second attachment members 52, 54 interact with one another to limit adjustment or movement of the dome cover 12 with respect to the base unit 36. In several aspects, the first and second attachment members 52, 54 are fasteners such as compression fittings, bolts, nuts, screws, clamps, spring bolts, clips, and associated receivers for the above fasteners, compression fittings, bolts, nuts, screws, clamps, spring bolts, and clips. Thus, the first and second attachment members 52, 54 may be described more generally as fasteners and fastener counterparts. Additionally, the dome cover 12 is spaced apart from the base unit 36 so that the outer perimeter 20 is spaced apart from the base unit 36 by a distance "D". In several aspects, the distance "D" varies depending on the angular position of the dome cover 12 relative to the base unit 36. Moreover, the distance "D" varies around the outer perimeter 20 of the dome cover 12.

Because the dome cover 12 is spaced apart from the base unit 36 by distance "D", when the camera apparatus 10 is attached to an exterior surface or aspect of a motor vehicle, building structure, or the like, precipitation can flow through the distance "D" and past the camera apparatus 10 unimpeded. Moreover, because the camera unit 26 is sealingly attached to the dome cover 12 and because the camera unit 26 is also at least partially surrounded by the upper section 50 of the flared collar portion 40, precipitation is guided past the camera unit 26 without contacting the camera unit 26.

Additionally, the universal attachment portion 38 has a recessed area 56 proximate the mounting surface. The recessed area 56 is inset from the rounded outer edge 44 of the universal attachment portion 38 and substantially parallel to the mounting surface to which the universal attachment portion 38 is attached. The recessed area 56 is also shaped to accept a third attachment member 58 such as a double-sided tape, a gasket material, a suction attachment member, or a mechanical attachment member such as a toggle anchor, a hinged foot, or a rivet nut. Moreover, the recessed area 56 is shaped to allow the universal attachment portion 38 to further sealingly engage with a variety of mounting surfaces having any number of contours. Thus, the recessed area 56 provides a means by which the camera apparatus 10 can be sealingly affixed to a variety of different mounting surfaces including, but not limited to: front, rear, side, and corners of motor vehicles such as busses, cars, trucks, trains and the like. Similarly, the camera apparatus 10 can be sealingly affixed to a variety of mounting surfaces, including stone, glass, metal, and plastics, such as may form the interior and exterior walls of buildings, roofs, without departing from the scope or intent of the present disclosure. In addition, the camera apparatus 10 can be mounted in any of a variety of orientations. That is, depending on the application and desired field of view of the camera unit 26, the camera apparatus 10 can be mounted in any rotational position about axis "A" without departing from the scope or intent of the present disclosure.

Turning now to FIGS. 3A-3F and with continuing reference to FIGS. 1A-2B, a second example of the camera apparatus 10 is shown and generally indicated by reference numeral 10'. The second example of the camera apparatus 10' is substantially similar to the first example of the camera apparatus, and therefore like components are referenced by like numerals. In the example of FIGS. 3A-3F, the camera apparatus 10' includes a dome cover 12' having a central aperture 14'. In several aspects, the central aperture 14' is a substantially cylindrical opening extending from an exterior surface 16' of the dome cover 12' to an interior surface 18'. The dome cover 12' is substantially frustoconical in shape having a first axis "A", and extending from an outer perimeter 20' to a central peak 22'. In some aspects, dome cover's 12' frustoconical shape includes multiple frustoconical sloped portions 13'. In the example of FIGS. 3A-3F, the dome cover 12' includes a first frustoconical sloped segment 15' and a second frustoconical sloped segment 17'. In further aspects, the central peak 22' has an angled portion 24'. The angled portion 24' has a second axis "B" angled with respect to the first axis "A". In some aspects, the first axis "A" and the second axis "B" are angled by about 30° with respect to one another.

A camera unit 26' (shown in significantly more detail in FIGS. 4A and 4B) is mounted to the interior surface 18' of the dome cover 12'. In one example, the camera unit 26' is mounted to the interior surface 18' of the dome cover 12' by a plurality of attachment members 19', such as screws, bolts, press fittings, clips, and the like. In addition, the camera unit 26' is sealed to the interior surface 18' of the dome cover 12' by a first seal 28' disposed between the interior surface 18' of the dome cover 12' and the camera unit 26'.

The camera apparatus 10' also includes a base unit 36'. The base unit 36' extends from a universal attachment portion 38' to a flared collar portion 40'. The flared collar portion 40' at least partially surrounds the camera unit 26'. The universal attachment portion 38' has a substantially frustoconical upper surface 42' extending from a rounded outer edge 44' at an interface with a mounting surface (not shown) to a lower section 46' of the flared collar portion 40'. In one example, the flared collar portion 40' is integrally and unitarily moulded with the universal attachment portion 38'. In another example, the flared collar portion 40' is separate from the universal attachment portion 38'. In the second example, the separate flared collar portion 40' is assembled with the universal attachment portion 38' and a second seal 41'. The second seal 41' is disposed between a first joining section 43' of the universal attachment portion 38' and a second joining section 45' of the lower section 46' of the flared collar portion 40'. In some aspects, the base unit 36' has an overall profile that is somewhat akin to an Erlenmeyer flask, or an hourglass. That is, a radius of the flared collar portion 40' is smallest at or near the lower section 46', and largest at or near the dome cover 12'.

The base unit 36' also includes a central opening 48' extending through the base unit 36' from the interface with the mounting surface to an upper section 50' of the flared collar portion 40'. The central opening 48' provides a conduit through which electrical connectors, wiring, and the like may be disposed. The base unit 36' has been described above as having a central opening 48' extending through the base unit 36' from the interface to the upper section 50' of the flared collar portion 40'. However, it should be understood that in some variations, the camera apparatus 10' operates wirelessly. In wireless examples, depending on the application, costs, and scale, the base unit 36' may or may not include a central opening 48' extending all the way from the interface to the upper section 50'. In other words, in some examples, the central opening 48' extends only through a portion of the base unit 36' from the upper section 50' towards the interface with the mounting surface. The universal attachment portion 38' forms a waterproof connection with the mounting surface. In some aspects, at least a portion of the universal attachment portion 38' is made of a flexible or resilient material such as rubber, silicone, flexible plastic material, or the like.

The dome cover 12' is adjustably connected to the base unit 36'. The dome cover 12' is angularly and/or rotatably adjustable relative to the base unit 36' from about 30° either side of perpendicular to the mounting surface to which the base unit 36' is mounted. In some aspects, the dome cover 12' is rotatably adjustable about an axis "C" of rotation relative to the base unit 36'. In a further aspect, the dome cover 12' adjustably swivels on top of the base unit 36'.

That is, the dome cover 12' is adjustable from about 65° to the surface to about 135° to the mounting surface. The dome cover 12' includes a first attachment member 52'. The first attachment member 52' engages with a second attachment member 54' of the base unit 36'. The first and second attachment members 52', 54' interact with one another to limit adjustment or movement of the dome cover 12' with respect to the base unit 36'. In several aspects, the first and second attachment members 52', 54' are fasteners such as compression fittings, bolts, nuts, screws, clamps, spring bolts, clips, and associated receivers for the above fasteners, compression fittings, bolts, nuts, screws, clamps, spring bolts, and clips. Thus, the first and second attachment members 52', 54' may be described more generally as fasteners and fastener counterparts. Additionally, the dome cover 12' is spaced apart from the base unit 36' so that the outer perimeter 20' is spaced apart from the base unit 36' by a distance "D". In several aspects, the distance "D" varies depending on the angular position of the dome cover 12' relative to the base unit 36'. Moreover, the distance "D" varies around the outer perimeter 20' of the dome cover 12'. In the example of FIGS. 3A-3F, the outer perimeter 20' of the dome cover 12' varies around a circumferential aspect of the dome cover 12'. That is, the second frustoconical sloped segment 17' varies in extent relative to the first frustoconical sloped segment 15'. Thus, the distance "D" varies with respect not only to the angular position of the dome cover 12', but with respect to the circumferential position along the outer perimeter 20' of the second frustoconical sloped segment 17' of the dome cover 12'.

Because the dome cover 12' is spaced apart from the base unit 36' by distance "D", when the camera apparatus 10' is attached to an exterior surface or aspect of a motor vehicle, building structure, or the like, precipitation can flow through the distance "D" and past the camera apparatus 10' unimpeded. Moreover, because the camera unit 26' is sealingly attached to the dome cover 12' and because the camera unit 26' is also at least partially surrounded by the upper section 50' of the flared collar portion 40', precipitation is guided past the camera unit 26' without contacting the camera unit 26'. In some aspects, the interior surface 18' of the dome cover 12' includes a protrusion or flap 55' extending downwards and towards the flared collar portion 40' from an upwardly-oriented portion of the dome cover 12'. Thus, the flap 55' assists in guiding precipitation around and away from the flared collar portion 40', thereby increasing weatherproof characteristics of the camera apparatus 10'.

The universal attachment portion 38' of the example of FIGS. 3A-3F has a recessed area 56' proximate the mounting surface. The recessed area 56' is inset from the rounded outer edge 44' of the universal attachment portion 38', and substantially parallel to the mounting surface to which the universal attachment portion 38' is attached. The recessed area 56' is also shaped to accept a third attachment member 58' such as a double-sided tape, a gasket material, a suction attachment member, or a mechanical attachment member such as a toggle anchor, a hinged foot, or a rivet nut. Moreover, the recessed area 56' is shaped to allow the universal attachment portion 38' to sealingly engage with a variety of mounting surfaces having any number of contours. Thus, the recessed area 56' provides a means by which the camera apparatus 10' can be sealingly affixed to a variety of different mounting surfaces including, but not limited to: front, rear, side, and corners of motor vehicles such as busses, cars, trucks, trains and the like. Similarly, the camera apparatus 10' can be sealingly affixed to a variety of mounting surfaces, including stone, glass, metal, and plastics, such as may form the interior and exterior walls of buildings, roofs, without departing from the scope or intent of the present disclosure. In addition, the camera apparatus 10' can be mounted in any of a variety of orientations. That is, depending on the application and desired field of view of the camera unit 26', the camera apparatus 10' can be mounted in any rotational position about axis "C" without departing from the scope or intent of the present disclosure.

The camera apparatus 10 of the present disclosure offers several advantages. These include ease of manufacture, low cost, simplicity of construction, redundancy, resiliency, portability, improved longevity, and resilience in the face of adverse weather conditions. The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A universal camera apparatus for attachment to a surface, the universal camera apparatus comprising:
   a dome cover having a central aperture;
   a camera unit having a body portion and a lens, the body portion mounted to the dome cover and covered by the dome cover, the lens disposed within the central aperture; and
   a base unit supporting the dome cover, the base unit having a central opening extending through the base unit from a universal attachment portion to a collar portion, the universal attachment portion forming a seal at an interface with the surface,
   wherein the collar portion at least partially surrounds the camera unit, and wherein the dome cover is adjustable about an axis of rotation relative to the base unit, and the universal camera apparatus is rotatable about an axis of rotation, and wherein the camera unit is in sealing engagement with the dome cover.

2. The universal camera apparatus of claim 1 wherein the camera unit extends into the central opening in the base unit, and wherein wiring from the camera unit extends through the central opening.

3. The universal camera apparatus of claim 1 wherein the universal camera apparatus operates wirelessly.

4. The universal camera apparatus of claim 1 wherein the dome cover is substantially frustoconical, extending from an outer perimeter to the central opening, and wherein the outer perimeter is spaced apart from the universal attachment portion by a distance.

5. The universal camera apparatus of claim 4 wherein the substantially frustoconical dome cover comprises a plurality of facets extending from the outer perimeter to the central opening.

6. The universal camera apparatus of claim 1 wherein the dome cover further comprises an angled top portion, the angled top portion being formed in the dome cover proximate the central aperture, wherein the angled top portion has a first axis angled with respect to a second axis of the frustoconical dome cover.

7. The universal camera apparatus of claim 6 wherein the camera unit is in sealing engagement with the angled top portion of the dome cover.

8. The universal camera apparatus of claim 1 wherein the universal attachment portion is substantially frustoconical in shape, extending from an outer edge at the interface with the surface to a lower section of the collar portion, wherein the collar portion is flared.

9. The universal camera apparatus of claim 8 wherein the flared collar portion extends from the lower section to an upper section, wherein the upper section is proximate the central aperture and the camera unit, wherein a radius of the flared collar portion is smallest at the lower section and largest at the upper section.

10. The universal camera apparatus of claim 1 wherein the base unit further comprises a first attachment member engaging with a second attachment member of the dome cover, the first attachment member and second attachment member limiting adjustment or movement of the dome cover relative to the base unit.

11. The universal camera apparatus of claim 10 wherein the base unit further comprises a third attachment member, the third attachment member comprising a recessed area proximate the surface and substantially parallel to the surface, a double-sided tape, a gasket material, a suction attachment member, or a mechanical attachment member comprising a toggle anchor, a hinged foot, or a rivet nut.

12. The universal camera apparatus of claim 10 wherein the first attachment member and the second attachment member comprise fasteners, compression fittings, bolts, nuts, screws, clamps, spring bolts, clips, and receivers for fasteners, compression fittings, bolts, nuts, screws, clamps, spring bolts, and clips.

13. The universal camera apparatus of claim 10 wherein the first attachment member and the second attachment member secure the dome cover in a predetermined range of positions, wherein the second axis is angularly adjustable from about 30° either side of perpendicular to the surface, or from about 60° to the surface the surface, to about 120° to the surface.

14. The universal camera apparatus of claim 1 wherein at least a portion of the universal attachment portion further comprises a resilient material.

15. A camera mount for attachment to a surface, the camera mount comprising:
   a camera unit having a lens and an image sensor mounted in an image sensor mounting unit;
   a frustoconical dome cover disposed overtop the camera unit, the frustoconical dome cover extending from an outer perimeter to a central peak, the central peak having a cylindrical opening, the lens disposed within the cylindrical opening, the dome cover having a first attachment member; and
   a base unit supporting the dome cover, the base unit having second attachment member engaging with the first attachment member, the first attachment member and the second attachment member limiting adjustment or movement of the dome cover relative to the base unit, the base unit having a central opening extending through the base unit from a universal attachment portion to a collar portion, the universal attachment portion having a substantially frustoconical shape and extending from a rounded outer edge at an interface with a surface to a lower section of the collar portion, at least a portion of the universal attachment portion being composed of a resilient material and forming a seal at the interface with the surface, wiring from the camera unit extending through the central opening, and the collar portion at least partially surrounding the camera unit,
   wherein the frustoconical dome cover is adjustable about an axis of rotation relative to the base unit, the outer perimeter of the frustoconical dome cover is spaced apart from the base unit, and wherein the first attachment member engages with the second attachment member limiting adjustment about the axis of rotation, and the camera mount is rotatable about an axis of rotation, and wherein the first attachment member and the second attachment member secure the frustoconical dome cover in a predetermined range of positions, wherein an axis of the frustoconical dome cover is angularly adjustable from about 30° either side of perpendicular to the surface, or from about 60° to the surface the surface, to about 120° to the surface.

16. The camera mount of claim 15 wherein the collar portion is flared and extends from the lower section to an upper section, wherein the upper section is proximate the cylindrical opening and the camera unit, wherein a radius of the collar portion is at a minimum at the lower section and at a maximum at the upper section.

17. The camera mount of claim 15 wherein the dome cover further comprises an angled top portion, the angled top portion being formed in the dome cover proximate the cylindrical opening, and including the cylindrical opening, wherein the camera unit is in sealing engagement with the angled top portion of the dome cover.

18. The camera mount of claim 15 wherein the universal attachment portion further comprises a recessed area proximate to the surface and substantially parallel to the surface and a third attachment member attaching the universal attachment portion to the surface, the third attachment member comprising a double-sided tape, a gasket material, a suction attachment member, a toggle anchor, a hinged foot, or a rivet nut.

19. The camera mount of claim 15 wherein the first attachment member and the second attachment member comprise fasteners, compression fittings, bolts, nuts, screws, clamps, spring bolts, clips, and receivers for fasteners, compression fittings, bolts, nuts, screws, clamps, spring bolts, and clips.

20. The camera mount of claim 19 wherein at least one of the receivers further comprises a blind hole receiving a fastener.

21. A camera mount for attachment to a surface, the camera mount comprising:
   a camera unit having a lens and an image sensor mounted in an image sensor mounting unit;
   a substantially frustoconical dome cover disposed overtop the camera unit, the substantially frustoconical dome cover extending from an outer edge to a central peak, the central peak having a cylindrical opening, the lens disposed within the cylindrical opening, the substantially frustoconical dome cover having a first attachment member;

the substantially frustoconical dome cover having an angled top portion having an axis angled with respect to a second axis of the substantially frustoconical dome cover, the angled top portion being formed in the substantially frustoconical dome cover proximate the cylindrical opening and including the cylindrical opening, wherein the camera unit is in sealing engagement with the angled top portion of the dome cover;

a base unit supporting the dome cover and having a universal attachment portion, the base unit having a central opening, a collar portion, and a second attachment member engaging with the first attachment member, the first attachment member and the second attachment member limiting adjustment or movement of the substantially frustoconical dome cover relative to the base unit, the universal attachment portion having a substantially frustoconical shape and extending from a rounded outer edge of the universal attachment portion at an interface with the surface to a lower section of the collar portion, the collar portion extending from a lower section to an upper section, the upper section proximate to the cylindrical opening and the camera unit, wherein a radius of the collar portion is at a minimum at the lower section and at a maximum at the upper section, at least a portion of the universal attachment portion being composed of a resilient material and forming a seal at an interface with the surface, wiring from the camera unit extending through the central opening, and the collar portion at least partially surrounding the camera unit;

the universal attachment portion having a recessed area proximate to the surface and substantially parallel to the surface and a third attachment member attaching the universal attachment portion to the surface, the third attachment member comprising a double-sided tape, a gasket material, a suction attachment member, a toggle anchor, a hinged foot, or a rivet nut, wherein the frustoconical dome cover is adjustable about an axis of rotation relative to the base unit, the outer edge of the frustoconical dome cover is spaced apart from the base unit, and wherein the first attachment member engages with the second attachment member limiting adjustment about the axis of rotation, wherein movement of the frustoconical dome cover is limited to about 30° from either side of perpendicular to the surface, or from about 60° to the surface the surface, to about 120° to the surface, and the camera mount is rotatable about an axis of rotation.

* * * * *